(12) United States Patent
Didier

(10) Patent No.: US 8,691,106 B2
(45) Date of Patent: Apr. 8, 2014

(54) INSULATION PRODUCT BASED ON FIRE-RESISTANT MINERAL WOOL, MANUFACTURING PROCESS AND SUITABLE SIZING COMPOSITION

(75) Inventor: Benoît Didier, Paris (FR)

(73) Assignee: Saint-Gobain Isover, Courbevoie (FR)

( * ) Notice: Subject to any disclaimer, the term of this patent is extended or adjusted under 35 U.S.C. 154(b) by 169 days.

(21) Appl. No.: 13/142,658

(22) PCT Filed: Dec. 28, 2009

(86) PCT No.: PCT/FR2009/052710
§ 371 (c)(1),
(2), (4) Date: Jul. 12, 2011

(87) PCT Pub. No.: WO2010/076533
PCT Pub. Date: Jul. 8, 2010

(65) Prior Publication Data
US 2011/0266488 A1    Nov. 3, 2011

(30) Foreign Application Priority Data
Dec. 30, 2008    (FR) ..................... 08 59129

(51) Int. Cl.
*C03C 13/06* (2006.01)
*C08K 7/14* (2006.01)
*D04H 1/64* (2012.01)

(52) U.S. Cl.
USPC ........................................ 252/62; 428/921

(58) Field of Classification Search
USPC ........................................... 252/62; 428/921
See application file for complete search history.

(56) References Cited

U.S. PATENT DOCUMENTS

| | | | |
|---|---|---|---|
| 4,159,139 A | 6/1979 | Gawedzinski | |
| 5,340,868 A | 8/1994 | Strauss et al. | |
| 5,840,413 A | 11/1998 | Kajander | |
| 6,284,684 B1 * | 9/2001 | Vignesoult et al. | 501/36 |
| 6,368,991 B1 | 4/2002 | Horner, Jr. et al. | |
| 2007/0105467 A1 | 5/2007 | Bennett | |

FOREIGN PATENT DOCUMENTS

| | | |
|---|---|---|
| DE | 196 04 238 | 8/1997 |
| EP | 1 522 640 | 4/2005 |
| FR | 2 783 516 | 3/2000 |
| GB | 1 105 653 | 3/1968 |
| JP | 54015093 A * | 2/1979 |
| JP | 54050694 A * | 4/1979 |
| WO | WO 00/17117 | 3/2000 |
| WO | WO 2005/033022 | 4/2005 |
| WO | WO 2005/033032 | 4/2005 |
| WO | WO 2008/043960 | 4/2008 |

OTHER PUBLICATIONS

International Search Report as issued for International Application No. PCT/FR2009/052710, dated Mar. 11, 2010.

* cited by examiner

*Primary Examiner* — Anthony J Green
(74) *Attorney, Agent, or Firm* — Pillsbury Winthrop Shaw Pittman LLP

(57) ABSTRACT

A fire-resistant thermal and/or acoustic insulation product based on mineral wool and on an organic binder, including a carboxylic acid metal salt as fire retardant, the salt being in particular a carboxylate of a metal chosen from the group formed by aluminum, zinc, calcium and magnesium. A process is disclosed for manufacturing the fire-resistant insulation product and a sizing composition suitable for producing the product is disclosed.

22 Claims, No Drawings

INSULATION PRODUCT BASED ON FIRE-RESISTANT MINERAL WOOL, MANUFACTURING PROCESS AND SUITABLE SIZING COMPOSITION

CROSS-REFERENCE TO RELATED APPLICATIONS

This application is the U.S. National Stage of PCT/FR2009/052710, filed Dec. 28, 2009, which in turn claims priority to French Application No. 0859129, filed Dec. 30, 2008. The content of both applications are incorporated herein by reference in their entirety.

The present invention relates to the field of fire-resistant thermal and/or acoustic insulation products based on mineral wool, especially glass wool or rock wool, and an organic binder. More precisely, the invention relates to insulation products that contain a carboxylic acid metal salt as fire retardant.

The invention also relates to the process for manufacturing said insulation products and to the sizing composition suitable for their manufacture.

Glass-fiber-based products are widely used, in particular for the manufacture of thermal and/or acoustic insulation products in which the fibers are in the form of mineral wool.

In the insulation products, the fibers are bound by a thermosetting resin, in most cases a phenolic resin belonging to the family of resols, which can be easily crosslinked thermally, is soluble in water, has a strong affinity for mineral fibers and is relatively inexpensive. This resin gives the insulating product the required properties, such as dimensional stability, tensile strength, compression set (thickness recovery after being compressed) and uniform color.

In some applications in which the insulation product is exposed to high temperatures (household equipment, heating pipes, etc.) or has to meet strict regulations (in ships, public buildings, etc.), it is imperative for it also to have good fire resistance. In other words, it proves to be essential for flame propagation to be prevented or at least retarded when the crosslink resin binding the fibers is either subjected to high temperatures, resulting in the combustion thereof, or is exposed directly to flames.

Solutions have been proposed for improving the fire resistance of products containing mineral fibers, which consist in adding a fire retardant, for example a phosphorus compound (see U.S. Pat. No. 4,159,139), halogenated, especially chlorinated or brominated, compound, a nitrogen compound (see U.S. Pat. No. 5,840,413) or a metal hydroxide (see U.S. Pat. No. 6,368,991 and U.S. 2007/0105467).

However, these solutions are not entirely satisfactory:
phosphorus-containing compounds are expensive;
halogenated compounds are undesirable because of the risk to operators that they may entail (partial decomposition with the emission of toxic halogenated gases) and the risks to the manufacturing line (corrosion). In addition, halogenated compounds generate large volumes of smoke containing toxic gases when they are exposes directly to flames; and
metal hydroxides are difficult to process. Because of their water insolubility, metal hydroxides are employed in the form of an aqueous dispersion, and also in a large amount in order to obtain the fire retarding effect.
The disadvantages associated with applying the aqueous dispersion, which is generally sprayed onto the mineral wool, are the risk of the spray nozzles becoming clogged and a nonuniform distribution of the metal hydroxide particles in the end product.

The objective of the present invention is to provide a fire-resistant thermal and/or acoustic insulation product that contains a water-soluble fire retardant distributed uniformly within said product.

To achieve this objective, the invention uses a carboxylic acid metal salt as fire retardant, in particular a carboxylate of a metal chosen from aluminum, zinc and magnesium, preferably magnesium.

According to a first embodiment of the invention, the carboxylic acid metal salt is a metal salt of a nonpolymeric organic acid, for example a monocarboxylic acid, such as an acetate, of a dicarboxylic acid, such as a succinate, an adipate, a citraconate or a phthalate, or a tricarboxylic acid, such as a citrate or a trimellitate, or a tetracarboxylic acid, such as a 1,2,3,4-butanetetracarboxylate.

Polycarboxylic acid metal salts are preferred.

Advantageously, the carboxylic acid metal salt is a metal salt of a branched or unbranched, saturated or unsaturated, alicyclic acid, of a cyclic acid or of an aromatic acid.

Advantageously, the carboxylic acid metal salt is aluminum acetate, zinc acetate, magnesium acetate, magnesium succinate, aluminum adipate, magnesium adipate, magnesium citraconate, aluminum phthalate, magnesium phthalate, aluminum citrate, zinc citrate, magnesium citrate, magnesium trimellitate or magnesium 1,2,3,4-butanetetracarboxylate. Magnesium phthalate and magnesium citrate are most particularly preferred.

According to a second embodiment of the invention, the carboxylic acid metal salt is a salt of a polymeric organic acid, for example a (meth)acrylic acid homopolymer or copolymer. Preferably, the metal salt is a salt of a polymer containing 20 to 30 (meth)acrylic acid residues.

The carboxylic acid metal salt according to the invention may be obtained by a salification reaction between the carboxylic acid and a corresponding metal hydroxide, namely aluminum hydroxide, magnesium hydroxide or zinc hydroxide.

As indicated above, the carboxylic acid is a monocarboxylic, dicarboxylic, tricarboxylic or tetracarboxylic nonpolymeric organic acid or a (meth)acrylic acid polymer. Advantageously, the nonpolymeric carboxylic acid is a branched or unbranched, saturated or unsaturated, alicyclic acid, a cyclic acid or an aromatic acid, and the polymeric carboxylic acid is a polyacrylic acid.

Particularly advantageously, the carboxylic acid is phthalic acid, citric acid or an acrylic acid/hydroxyethylacrylate copolymer, and the metal hydroxide is magnesium hydroxide.

The salification reaction is carried out by simply mixing the carboxylic acid, dissolved in water, with the metal hydroxide at room temperature, around 25 to 30° C., or at a higher temperature, but not however exceeding 100° C.

The organic acid and the metal hydroxide are reacted under stoichiometric conditions, or even with a slight excess of carboxylic acid. The term "slight excess" is understood to mean an amount of carboxylic acid resulting in a moderately acid pH, for example around 6, and which may be up to 7. Such a pH prevents the risk of corrosion in the insulation product manufacturing line and precipitation of the resin when the fire retardant is introduced into the sizing composition, as will be explained later.

The nonpolymeric carboxylic acid metal salt may also be obtained by reacting the ammonium salt of the carboxylic acid with the corresponding metal sulfate, preferably ammonium phthalate or ammonium citrate with magnesium sulfate.

The reaction is carried out by simply mixing the aforementioned compounds in water at a temperature of around 25 to 30° C., preferably under stoichiometric conditions. Where appropriate, an additional step of purifying the reaction product is carried out so as to remove the ammonium sulfate formed.

The fire retardant solution thus obtained may contain up to 50%, preferably up to 30% and advantageously from 10 to 20% by weight of solid matter.

The amount of fire retardant represents from 0.05 to 5%, preferably at most 2% and advantageously from 0.1 to 2% of the total weight of the insulation product.

The organic binder that holds the mineral wool together in the final insulation product is the product resulting from the thermal crosslinking of a phenolic resin, a urea-formaldehyde resin, a poly(meth)acrylic acid resin, for example one containing a (meth)acrylic acid homopolymer or a (meth)acrylic acid/hydroxyethylacrylate copolymer, a polyurethane resin or an alkyd resin, or the product resulting from the thermal reaction of a mixture containing at least one saccharide and at least one protein. Preferably, the resin is a phenolic resin or a poly(meth)acrylic acid resin.

Preferably, the resin is a phenolic resin, advantageously a resol obtained by the condensation of a phenolic compound, preferably phenol, with an aldehyde, preferably formaldehyde in the presence of a basic catalyst, in a formaldehyde/phenol molar ratio greater than 1. The resol may have been modified beforehand by a reaction with urea.

The amount of resin represents from 1 to 10%, preferably at most 5%, by weight of solid matter relative to the total weight of the insulation product.

The insulation product combining a resol having a low free formaldehyde content (less than 0.05%) and magnesium phthalate proves to be particularly advantageous in terms of fire resistance.

The mineral wool may consist of glass fibers or rock fibers.

The glass fibers may consist of a glass of any type whatsoever, in particular a glass having a high alumina content such as that described in WO 00/17117, which comprises the constituents below in the following proportions, expressed as percentages by weight:

| | | |
|---|---|---|
| $SiO_2$ | 39-55%, | preferably 40-52% |
| $Al_2O_3$ | 16-27%, | preferably 16-25% |
| CaO | 3-35%, | preferably 10-25% |
| MgO | 0-15%, | preferably 0-10% |
| $Na_2O$ | 0-15%, | preferably 6-12% |
| $K_2O$ | 0-15%, | preferably 3-12% |
| $R_2O$ ($Na_2O + K_2O$) | 10-17%, | preferably 12-17% |
| $P_2O_5$ | 0-3%, | preferably 0-2% |
| $Fe_2O_3$ | 0-15%, | |
| $B_2O_3$ | 0-8%, | preferably 0-4% |
| $TiO_2$ | 0-3%, | | the MgO content being between 0 and 5% when the $R_2O$ content is less than or equal to 13.0%.

Advantageously, the glass has the composition described in WO 2005/033022, which comprises the constituents below in the following proportions (in wt %):

| | | |
|---|---|---|
| $SiO_2$ | 39-44%, | preferably 40-43% |
| $Al_2O_3$ | 16-27%, | preferably 16-26% |
| CaO | 6-20%, | preferably 8-18% |
| MgO | 1-5%, | preferably 1-4.9% |
| $Na_2O$ | 0-15%, | preferably 2-12% |
| $K_2O$ | 0-15%, | preferably 2-12% |
| $R_2O$ ($Na_2O + K_2O$) | 10-14.7%, | preferably 10-13.5% |
| $P_2O_5$ | 0-3%, | especially 0-2% |
| $Fe_2O_3$ | 1.5-15%, | especially 3.2-8% |
| $B_2O_3$ | 0-2%, | preferably 0-1% |
| $TiO_2$ | 0-2%, | preferably 0.4-1%. |

The subject of the invention is also the process for manufacturing the fire-resistant insulation product described above.

The manufacture of insulation products based on mineral wool is well known: it comprises a step of manufacturing the wool itself, a step of sizing the mineral wool and a treatment step for the purpose of binding the mineral wool.

The first step in manufacturing the mineral wool may be carried out using various processes, for example the known fiberizing technique employing internal or external centrifugation.

Internal centrifugation consists in introducing the molten mineral (glass or rock) material into a spinner having a multitude of small holes, the material being thrown against the peripheral wall of the spinner under the action of the centrifugal force and escaping therefrom in the form of filaments. On leaving the spinner, the filaments are attenuated and entrained toward a receiving member by a high-temperature high-velocity gas stream, so as to form a web of fibers (or mineral wool) in said member.

External centrifugation consists in pouring the molten material onto the external peripheral surface of rotating members, called rotors, from which the molten material is ejected through the action of the centrifugal force. Also provided are gas-stream attenuating means and collecting means on a receiving member.

In the second step, a sizing composition is sprayed onto the fibers along the path going from the outlet of the spinner to the receiving member, said sizing composition containing a thermosetting resin the purpose of which is to assemble the fibers together and provide the mineral wool with cohesion.

In the third step, the size-coated fibers gathered into a web undergo a heat treatment, generally at a temperature above 100° C., in order to make the resin undergo polycondensation and thus bind the fibers together with an infusible and water-insoluble binder.

On leaving the heat treatment device, the insulation product is collected in the form of rolls or panels cut to the desired dimensions, and then packaged.

The process according to the present invention also includes a step consisting in applying the carboxylic acid metal salt on the mineral wool.

According to a preferred method of implementation, the carboxylic acid metal salt is incorporated into the sizing composition, thereby enabling it to be applied in a single step. The carboxylic acid metal salt may be added extemporaneously, for immediate application of the sizing composition or in the resin (or premix) which is preserved for a variable amount of time at a temperature of around 10 to 20° C. before being used in the sizing composition.

According to another method of implementation, the carboxylic acid metal salt is applied separately from the sizing composition.

Such an application may be carried out in various ways using the carboxylic acid metal salt dissolved in water.

According to a first preferred variant, the aqueous carboxylic acid metal salt solution is applied on the mineral fibers immediately after they have been formed, preferably before the sizing composition is applied.

According to a second and likewise preferred, variant, the aqueous carboxylic acid metal salt solution is applied on the mineral wool before its entry into the device for curing the resin, thereby making it possible to remove the water contained both in the solution of said salt and in the sizing composition.

According to a third variant, the aqueous carboxylic acid metal salt solution is applied on the heat-treated insulation product, preferably before it is collected. In this case, it is preferable to place an additional drying device downstream of the device for applying the carboxylic acid metal salt and upstream of the collecting member.

The carboxylic acid metal salt composition is generally applied by spraying. The fact that said salt is soluble in water helps in applying it well: deposits of solid matter possibly clogging the spray orifices are thus prevented and said agent is uniformly distributed on the mineral wool. Furthermore, the amount of carboxylic acid metal salt in the solution may be large, thereby limiting the amount of water and consequently in reducing the cost of treating the wastewater.

Whatever the method of implementation, the carboxylic acid metal salt is used in an amount of 5 to 50 parts, preferably at most 30 parts, advantageously at least 10 parts and better still 8 to 20 parts by weight (of solid matter) per 100 parts by weight (of solid matter) of resin and optionally urea or glycerol.

Yet another subject of the invention is a sizing composition suitable for the manufacture of the fire-resistant insulation product described above.

The sizing composition for insulating products based on mineral wool, especially glass wool or rock wool, comprises:
- at least one carboxylic acid metal salt, preferably a carboxylate of a metal chosen from the group formed by aluminum, zinc and magnesium;
- at least one thermosetting resin, preferably a phenolic resin, especially one belonging to the family of resols, or a poly(meth)acrylic acid resin; and
- optionally, urea or glycerol.

Preferably, the sizing composition contains from 8 to 20 parts by weight of carboxylic acid metal salt per 100 parts by weight (of solid matter) of thermosetting resin and, as the case may be, of urea, when the resin is a resol, or of glycerol, when the resin is a poly(meth)acrylic acid resin.

The sizing composition according to the invention may furthermore include the conventional additives below in the following proportions calculated on the basis of 100 parts by weight of thermosetting resin and of urea or glycerol:
- 0 to 2 parts of silane, in particular an amino silane;
- 0 to 20 parts, preferably 4 to 15 parts, of oil;
- 0 to 10 parts, preferably less than 7 parts, of a polycondensation catalyst, for example ammonium sulfate;
- 0 to 20 parts, preferably less than 12 parts, of aqueous ammonia (20 wt % solution);
- 0 to 50 parts of an organophosphate; and
- 0 to 20 parts of a silicone.

The role of the additives is known, but is briefly recalled here: the silane is a coupling agent, for coupling between the fibers and the binder, and acts as an anti-aging agent; the oils are hydrophobic dust-preventing agents; the ammonium sulfate serves as a polycondensation catalyst (in the hot oven) after the sizing composition has been sprayed onto the fibers; the aqueous ammonia acts, when cold, as polycondensation retarder; the organophosphate prevents the mineral fibers from being sintered at high temperatures; and the silicone acts as a hydrophobic agent.

The following examples help to illustrate the invention without however limiting it.

EXAMPLES 1 to 7 a) preparation of aqueous carboxylic acid metal salt solutions:

The following carboxylic acids and metal hydroxides were mixed in stoichiometric quantities, with stirring, at 25° C. for 1 hour:

|   | Carboxylic acid | Metal hydroxide | Salt obtained |
|---|---|---|---|
| A | Phthalic acid | $Mg(OH)_2$ | Magnesium phthalate |
| B | Adipic acid | $Mg(OH)_2$ | Magnesium adipate |
| C | Citric acid | $Mg(OH)_2$ | Magnesium citrate |
| D | Acetic acid | $Mg(OH)_2$ | Magnesium acetate |

The aqueous carboxylic acid metal salt solutions obtained had a solids content of 45%.

b) preparation of the sizing compositions:

The sizing compositions given in Table 1 containing 20 parts by dry weight of the aqueous carboxylic acid metal salt solution obtained in a) and 100 parts by dry weight of one of the following thermosetting resins:

G: a phenolic resin prepared by reacting formaldehyde with phenol (formaldehyde/phenol molar ratio of 3.2) in the presence of a catalyst (NaOH: 6% by weight relative to the phenol) under the temperature conditions described above until a degree of phenol conversion greater than 97% was obtained. The resin was then neutralized to pH 7.3 by sulfamic acids. Next, 40 parts by weight of urea were added to 60 parts of the phenolic resin;

H: a resin prepared according to Example 1 of WO 2008/043960;

I: a polyacrylic acid resin: acrylic acid/hydroxyethylacrylate copolymer sold under the reference QRXP 1736 by Rohm and Haas.

The sizing compositions were placed in a dish and heated in an oven for 60 minutes at 110° C. to remove the water, and then for 20 minutes at 180° C. to cure the resin.

The residue remaining in the dish after curing was analyzed by TGA (thermogravimetric analysis) under the following conditions: 10 mg of the residue were removed and deposited in an alumina crucible, which was then placed in an apparatus for continuously measuring the weight loss during a temperature cycle ranging from 25° C. to 700° C. at a rate of 10° C./minute. The temperature corresponding to 50% weight loss of the initial organic material on the recorded curve was determined.

The temperatures of the sizing compositions according to the invention are given in Table 1 for comparison with the reference sizing compositions not containing a carboxylic acid metal salt or containing the corresponding metal hydroxide.

The addition of a magnesium carboxylate to the sizing compositions according to Examples 1 to 7 helps to improve the temperature resistance: the temperature corresponding to a 50% weight loss of the initial organic material is higher than that of the reference sizing compositions 1, 3 and 5 that contain only the thermosetting resin.

The sizing compositions of Examples 1 to 3 have a higher temperature resistance than that of reference 2 containing magnesium hydroxide.

The sizing composition of Example 4 has a temperature resistance very close to that of reference 4, which contains magnesium hydroxide.

EXAMPLE 8

A glass wool was manufactured by the internal centrifugation technique, in which the molten glass composition was converted to fibers by means of a tool called a spinner, comprising a basket forming a chamber for holding the molten composition and a peripheral band pierced by a multitude of holes: the spinner was rotated about its vertical axis of symmetry; the composition was expelled through the orifices, due to the effect of the centrifugal force; and the material escaping from the holes was attenuated into fibers with the help of an attenuating gas stream.

Conventionally, a sizing composition spray ring was placed beneath the fiberizing spinner so as to distribute the sizing composition uniformly over the glass wool that had just formed.

The mineral wool thus sized was collected on a belt conveyor provided with internal suction boxes that retain the mineral wool in the form of a felt or web on the surface of the conveyor. The conveyor then ran into an oven maintained at 250° C., where the constituents of the sizing composition polymerized, to form a binder.

Two insulation products were manufactured: the first using the sizing composition according to Example 3 (Example 8) and the second using the sizing composition according to reference 1.

The insulation products had a density of 66 kg/m³ and a thickness of 60 mm.

The insulation product according to Example 8 contained 0.2% magnesium citrate by weight (calculated as dry weight relative to the total weight of the insulation product) and had a loss on ignition of 2% (loss of ignition corresponding to the proportion by weight of organic matter in the product, this being determined by differential weighing of the product before/after the heat treatment for decomposing the organic matter).

The insulation products were subjected to fire resistance tests under the conditions of the standard described in Resolution A754(18) of the FTP code (International Code for Application of Fire Test Procedures) drafted by the IMO (International Maritime Organization).

The maximum temperature reached by the insulation product (corresponding to the maximum of the exothermic peak) was 190° C. in the case of the product according to Example 8 and 202° C. in the case of the reference product. These temperatures were reached in 20 minutes after the start of the test.

The insulation product according to Example 8, containing magnesium citrate, has a better fire resistance since the maximum temperature reached was 22° C. lower than that of the reference product containing no magnesium citrate.

It should be noted that this improved performance is achieved without degrading the overall properties of the product, especially the mechanical properties. Thus, the insulation product according to Example 8 had a compressive strength of 5.3 kPa, similar to that of the product using the sizing composition according to reference 1. The compressive strength was measured under the conditions in the standard EN 826 (Thermal Insulating Products for Building Applications; Determination of Compression Behavior).

TABLE 1

| Example | Metal salt | Resin | Metal hydroxide | Temperature (° C.) |
|---|---|---|---|---|
| 1 | A | G | — | 540 |
| 2 | B | G | — | 517 |
| 3 | C | G | — | 521 |
| 7 | D | G | — | 420 |
| Ref. 1 | — | G | — | 471 |
| Ref. 2 | — | G | Magnesium | 484 |
| 4 | B | H | — | 580 |
| 5 | C | H | — | 534 |
| Ref. 3 | — | H | — | 484 |
| Ref. 4 | — | H | Magnesium | 589 |
| 6 | C | I | — | 442 |
| Ref. 5 | — | I | — | 377 |
| Ref. 6 | — | I | Magnesium | 470 |

The invention claimed is:

1. A fire-resistant thermal and/or acoustic insulation product comprising a mineral wool, an organic binder, wherein the mineral wool includes mineral fibers that are linked together at their junctions with said organic binder to hold said mineral wool together in said insulation product, and a polycarboxylic acid metal salt as fire retardant.

2. The product as claimed in claim 1, wherein the polycarboxylic acid metal salt is a metal salt of a dicarboxylic, tricarboxylic or tetracarboxylic nonpolymeric organic acid or of a polymeric organic acid.

3. The product as claimed in claim 2, wherein the nonpolymeric polycarboxylic acid metal salt is a metal salt of a branched or unbranched, saturated or unsaturated, alicyclic acid, of a cyclic acid or of an aromatic acid and wherein the metal salt of a polymeric organic acid is a salt of a (meth) acrylic acid homopolymer or copolymer.

4. The product as claimed in claim 1, wherein the polycarboxylic acid metal salt is selected from the group consisting of magnesium succinate, aluminum adipate, magnesium adipate, magnesium citraconate, aluminum phthalate, magnesium phthalate, aluminum citrate, zinc citrate, magnesium citrate, magnesium trimellitate, magnesium 1,2,3,4-butanetetracarboxylate and a polymer containing 20 to 30 (meth) acrylic acid residues.

5. The product as claimed in claim 4, wherein the polycarboxylic acid metal salt is magnesium phthalate or magnesium citrate.

6. The product as claimed in claim 1, wherein the amount of polycarboxylic acid metal salt represents 0.05 to 5% of the total weight of the insulation product.

7. The product as claimed in claim 1, wherein the organic binder is a product resulting from a thermal crosslinking of a phenolic resin, a urea-formaldehyde resin, a poly(meth) acrylic acid resin, a polyurethane resin or an alkyd resin, or a product resulting from a thermal reaction of a mixture containing at least one saccharide and/or at least one protein.

8. The product as claimed in claim 7, wherein the resin represents from 1 to 10% by weight of solid matter relative to the total weight of the insulation product.

9. The product as claimed in claim 1, wherein the mineral wool consists of glass fibers, the glass of which comprises the constituents below in the following proportions, expressed as percentages by weight:

| | |
|---|---|
| $SiO_2$ | 39-55% |
| $Al_2O_3$ | 16-27% |
| CaO | 3-35% |
| MgO | 0-15% |
| $Na_2O$ | 0-15% |
| $K_2O$ | 0-15% |
| $R_2O$ ($Na_2O + K_2O$) | 10-17% |
| $P_2O_5$ | 0-3% |
| $Fe_2O_3$ | 0-15%, |

-continued

| | |
|---|---|
| B$_2$O$_3$ | 0-8% |
| TiO$_2$ | 0-3%, | the MgO content being between 0 and 5% when the R$_2$O content is less than or equal to 13.0%.

10. The product as claimed in claim 8, wherein the glass comprises the constituents below in the following proportions (in wt %):

| | |
|---|---|
| SiO$_2$ | 39-44% |
| Al$_2$O$_3$ | 16-27% |
| CaO | 6-20% |
| MgO | 1-5% |
| Na$_2$O | 0-15% |
| K$_2$O | 0-15% |
| R$_2$O (Na$_2$O + K$_2$O) | 10-14.7% |
| P$_2$O$_5$ | 0-3% |
| Fe$_2$O$_3$ | 1.5-15% |
| B$_2$O$_3$ | 0-2% |
| TiO$_2$ | 0-2%. |

11. The product as claimed in claim 1, wherein the mineral wool is a rock wool or a glass wool.

12. The product as claimed in claim 6, wherein the amount of polycarboxylic acid metal salt represents at most 2% of the total weight of the insulation product.

13. The product as claimed in claim 12, wherein the amount of polycarboxylic acid metal salt represents 0.1 to 2% of the total weight of the insulation product.

14. The product as claimed in claim 8, wherein the resin represents at most 5% by weight of solid matter relative to the total weight of the insulation product.

15. The product as claimed in claim 1, wherein the polycarboxylic acid metal salt is a polycarboxylate of a metal selected from the group consisting of aluminum, zinc and magnesium.

16. The product as claimed in claim 1, wherein the polycarboxylic acid metal salt is incorporated into the organic binder.

17. A fire-resistant thermal and/or product based on mineral wool and on an organic binder, the product comprising a polycarboxylic acid metal salt as fire retardant, wherein the polycarboxylic acid metal salt is a polycarboxylate of a metal selected from the group consisting of aluminum, zinc and magnesium.

18. The product as claimed in claim 17, wherein the metal is magnesium.

19. A fire-resistant thermal and/or acoustic insulation product consisting essentially of a mineral wool, an organic binder, and a polycarboxylic acid metal salt as fire retardant.

20. The product as claimed in claim 19, wherein the polycarboxylic acid metal salt is a polycarboxylate of a metal selected from the group consisting of aluminum, zinc and magnesium.

21. The product as claimed in claim 19, wherein the polycarboxylic acid metal salt is a metal salt of a dicarboxylic, tricarboxylic or tetracarboxylic nonpolymeric organic acid or of a polymeric organic acid.

22. The product as claimed in claim 19, wherein the organic binder is a product resulting from a thermal crosslinking of a phenolic resin, a urea-formaldehyde resin, a poly (meth)acrylic acid resin, a polyurethane resin or an alkyd resin, or a product resulting from a thermal reaction of a mixture containing at least one saccharide and/or at least one protein.

* * * * *